United States Patent [19]

Trabandt et al.

[11] Patent Number: 4,747,435
[45] Date of Patent: May 31, 1988

[54] PNEUMATIC VEHICLE TIRE

[75] Inventors: Hagen Trabandt, Sehnde; Achillefs Goris, Bad Nenndorf, both of Fed. Rep. of Germany

[73] Assignee: Continental Aktiengesellschaft, Hanover, Fed. Rep. of Germany

[21] Appl. No.: 822,045

[22] Filed: Jan. 24, 1986

[30] Foreign Application Priority Data

Jan. 25, 1985 [DE] Fed. Rep. of Germany ....... 3502483

[51] Int. Cl.$^4$ .............................................. B60C 11/06
[52] U.S. Cl. ................................................. 152/209 R
[58] Field of Search ........ 152/209 R, 209 D, DIG. 1, 152/154, 450

[56] References Cited

U.S. PATENT DOCUMENTS

| 2,779,378 | 1/1957 | Robertson | 152/209 R |
| 3,951,131 | 4/1976 | Yeager | 152/209 R |
| 4,423,760 | 1/1984 | Treves et al. | 152/209 R |

FOREIGN PATENT DOCUMENTS 0044903  4/1977  Japan ................ 152/209 D

Primary Examiner—Michael Ball
Attorney, Agent, or Firm—Becker & Becker, Inc.

[57]  ABSTRACT

A pneumatic vehicle tire having a tread strip that is provided with zig-zagged grooves that essentially extend in the circumferential direction of the tire. In order to be able to expel small foreign objects from the tread profile, and in addition in order to be able to increase the traction, those edges of the tread surface that project the furthest toward the grooves are provided with notches that are delimited by V-shaped faces. The notches extend radially inwardly essentially to the base of the grooves. The plane of symmetry of each of the notches is determined by the V-shaped faces, and extends transerse to the circumferential direction of the tire.

3 Claims, 1 Drawing Sheet

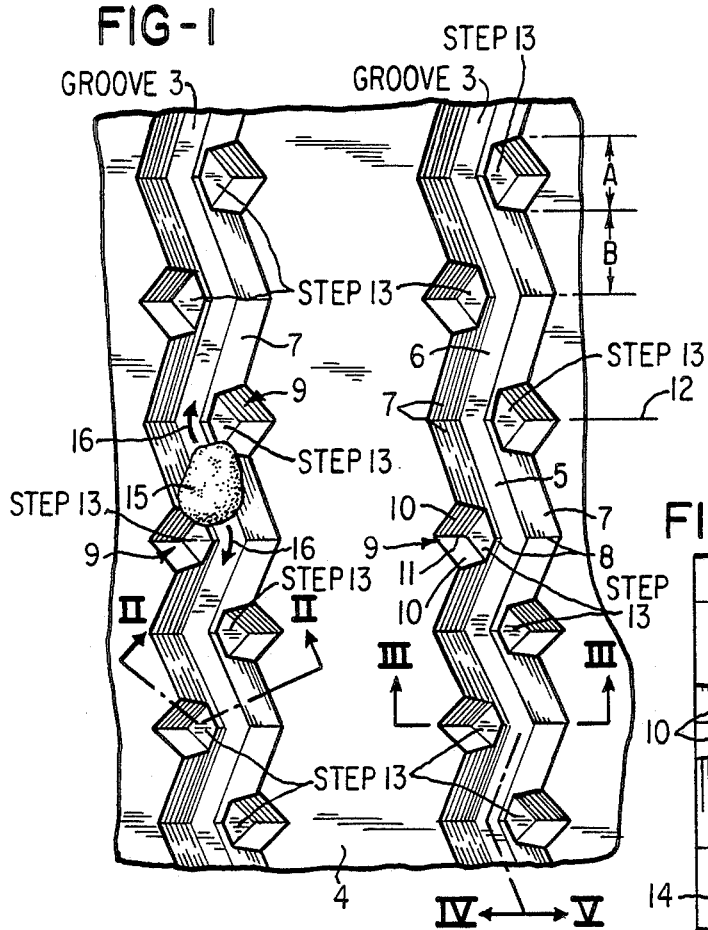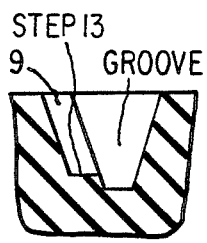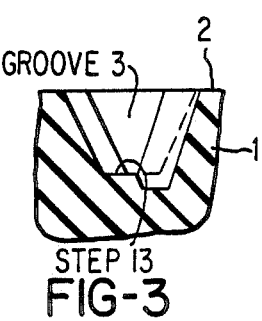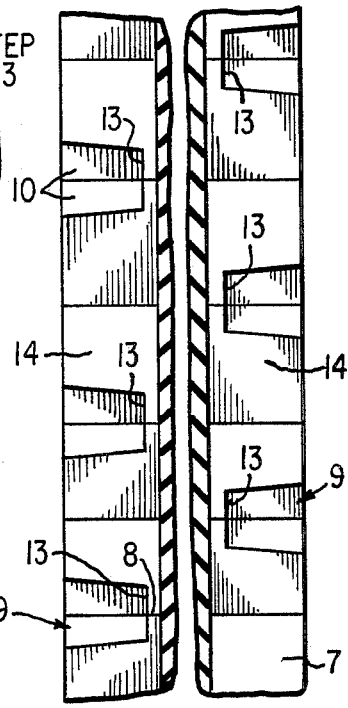

PNEUMATIC VEHICLE TIRE

BACKGROUND OF THE INVENTION

1. Field of the Invention

The present invention relates to a pneumatic vehicle tire having a tread strip that is provided with zig-zagged or wavelike grooves that essentially extend in the circumferential direction of the tire.

2. Description of the Prior Art

It is known to configure construct, form or arrange the cross-sectional shape of the grooves of the tread strip in such a way that foreign objects, especially small stones, can be ejected or expelled after they have entered the grooves. These heretofore known configurations predominantly attempt to achieve their task by the particular cross-sectional shape of the grooves.

It is similarly an object of the present invention to provide a tread profile that is capable of expelling small foreign objects. However, pursuant to the present invention, it is a further object of the invention to achieve this task predominantly via a modified cross-sectional shape of the profiling in such a way that not only the aforementioned expulsion is achieved, but also at the same time the traction of the tread is improved.

BRIEF DESCRIPTION OF THE DRAWING

These objects, and other objects and advantages of the present invention, will appear more clearly from the following specification in conjunction with the accompanying schematic drawing, in which:

FIG. 1 is a plan view of the tread surface of one exemplary inventive embodiment of a tire for a truck;

FIG. 2 is a cross-sectional view taken along the line II—II in FIG. 1;

FIG. 3 is a cross-sectional view taken along the line III—III in FIG. 1; and

FIGS. 4 and 5 are views that are folded into the plane of the drawing and illustrate the side faces of a circumferential groove as viewed in the direction of the arrows IV and V in FIG. 1.

SUMMARY OF THE INVENTION

The pneumatic vehicle tire of the present invention comprises side faces that essentially extend radially inwardly of the tread surface and delimit the circumferential grooves, with each of the latter having a base and side faces on each side of the base; the side faces on a given side of a given circumferential groove alternately extend in a first direction and in a second direction relative to the circumferential direction of the tire, with adjacent side faces abutting along lines that alternately project into and away from a given groove; cutouts or notches are provided in the side faces in the regions of those abutment lines that project into a groove; each notch has a base that is disposed at least essentially as far radially inwardly of the tread surface as is the base of that circumferential groove; each notch is delimited by side faces that essentially extend radially inwardly from the tread surface and extend to the base of the notch; the side faces of a given notch abut one another in a V-shaped manner along a line that is disposed in a plane of symmetry for those side faces, with this plane of symmetry extending transverse to the circumferential direction of the tire.

The notch side faces that extend V-shaped relative to one another expediently ascend steeply and at an angle in such a way that their steep ascent essentially corresponds to the ascent delimited by the circumferential grooves.

Such a profiling or shaping increases the traction of the tread strip. At the same time, any foreign objects caught in one of the grooves can move in either circumferential direction into the region of one of the aforementioned notches. In so doing, the foreign object reaches a widened area of the groove, where it can fall out of the latter. The wedging surfaces of the circumferential grooves are relatively narrow, so that even foreign objects wedged in at these locations can undergo a loosening due to the elastic deformation of the tread strip during rolling movement of the tire, whereupon a foreign object passes into one of those regions of the circumferential groove that has been widened by the aforementioned notches.

Further advantageous features of the present invention will be described in detail subsequently.

DESCRIPTION OF PREFERRED EMBODIMENTS

Referring now to the drawing in detail, the tire has a tread strip 1, the tread contact surface of which is designated by the reference numeral 2. The tread strip 1 advantageously has three, four, or five circumferential grooves 3 that extend over the entire periphery of the tire. These grooves 3 divide the tread strip 1 into an appropriate number of circumferential ribs 4.

The circumferential grooves 3 comprise sections 5 that ascend to the left, and sections 6 that ascend to the right. These sections 5, 6 are delimited by correspondingly oriented side faces 7 that ascend at an angle and steeply radially outwardly to form an essentially V-shaped groove 3. The side faces 7 abut one another along linearly extending corners or angles 8, also referred to as abutment lines.

The circumferential grooves 3 are provided with cutouts or notches 9 that are spaced from one another by a distance corresponding to half of the length of a given zig-zagged section. These notches 9 are alternately disposed on opposite sides of a given groove 3. Furthermore, the notches 9 are disposed at those locations of the edges of the tread surface 2 or circumferential ribs 4 that project the furthest into the grooves 3. The notches 9 are furthermore delimited by faces 10 that abut one another in a V-shaped manner along lines 11 that are disposed in a plane 12 that extends radially relative to the tire.

The depth of the cutouts or notches 9 is approximately 70 to 90% of the depth of the circumferential grooves 3, so that a base or a step 13 results near the base of the grooves 3. These steps at the same time serve to form wear indicators. If the tread strip 1 is worn to such an extent that the base of the notches 9 has in the meantime formed the tread contact surface 2, the optical pattern of the tread profile has been altered, thus indicating an increased degree of wear.

The open space A of the notches 9 in the tread surface 2 of a brand-new tire is relatively large, and in particular corresponds to 0.6 to 1 times the circumferential extension or length B of an associated one of the side faces 7 of the sections 5, 6 of a circumferential groove 3.

As a result of the inventive tread configuration, only relatively narrow regions 14 (FIGS. 4 and 5) are disposed opposite opposing ones of the side faces 7. If a foreign object 15, such as a stone, enters a region 14 of one of the grooves 3, it can become wedged in this region; however, even slight forces lead to a loosening of the stone and displacement in the direction of one of the arrows 16 (FIG. 1). In this way, the foreign object 15 passes into the region of one of the notches 9. Thus, the foreign object 15 is no longer wedged in and moves out of the groove 3.

The present invention is, of course, in no way restricted to the specific disclosure of the specification and drawing, but also encompasses any modifications within the scope of the appended claims.

What we claim is:

1. A pneumatic vehicle tire having a tread strip that is provided with a tread contact surface and zig-zagged or wavelike circumferential grooves that have a prescribed depth and that essentially extend in the circumferential direction of said tire so that traction of the tread strip is improved and also a tread profile is provided capable of expelling small foreign objects; said tire having the improvement therewith which further comprises:

side faces that essentially extend radially inwardly from said tread contact surface, and that delimit said circumferential grooves, with each of the latter having a base and side faces on each side of said base; the side faces on a given side of a given one of sid circumferential grooves alternately extend in a fist and a second direction relative to the circumferential direction of said tire, with adjacent ones of said side faces abutting along lines that alternately project into and away from the associated groove; notches are provided in said side faces in the region of those abutment lines that project into said grooves; each of said notches having a cutout depth in a range of approximately 70 to 90% of the depth of said circumferential grooves so that a corner step results therewith serving to form wear indicators of increased degree of wear in optical pattern of tread profile alteration and having a base that is deposed essentially as far radially inwardly of said tread contact surface as is said base of the associated groove; each of said notches is delimited by side faces that essentially extend radially inwardly from said tread contact surface and extend to said corner step of that notch to form a relatively large open space of the notches in the tread surface in such a way that foreign objects, especially small stones, can be ejected and expelled after entering the grooves; the side faces of a given one of said notches abut one another in a V-shaped manner along a line disposed in a plane of symmetry for those side faces, with said plane extending transverse to the circumferential direction of said tire and said corner step is located circumferential by in each of the notches that abut one another in the V-shaped manner, the width of the open space of a given one of said notches where its side faces abut side faces of the associated groove being approximately 0.6 to 1 times the circumferential length of an adjacent one of said side faces of said groove, with said measurements being taken in the circumferential direction of said tire in the newly maufactured state of the latter.

2. A tire according to claim 1 in which said side faces of said notches, when viewed from said bases of said circumferential grooves, extend steeply and at an incline radially outwardly.

3. A tire according to claim 2 in which said side faces of said grooves also extend radially outwardly at an incline, with the incline of said side faces of said notches corresponding to said incline of said side faces of said grooves.

* * * * *